Dec. 10, 1968   R. P. HABGOOD, JR., ET AL   3,415,406
CORNER JOINT STRUCTURE FOR RECTILINEAR CONTAINERS
Filed May 19, 1967
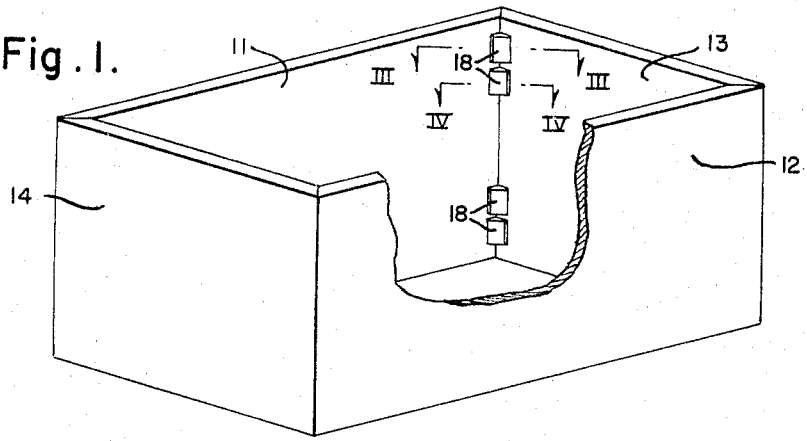
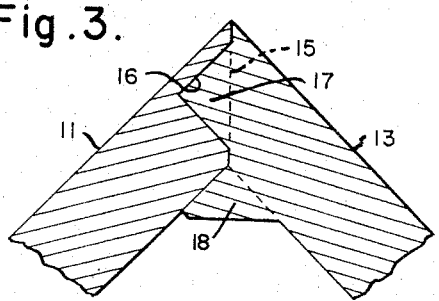
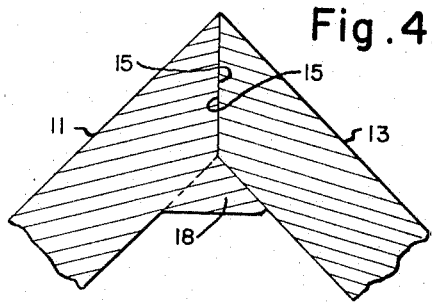
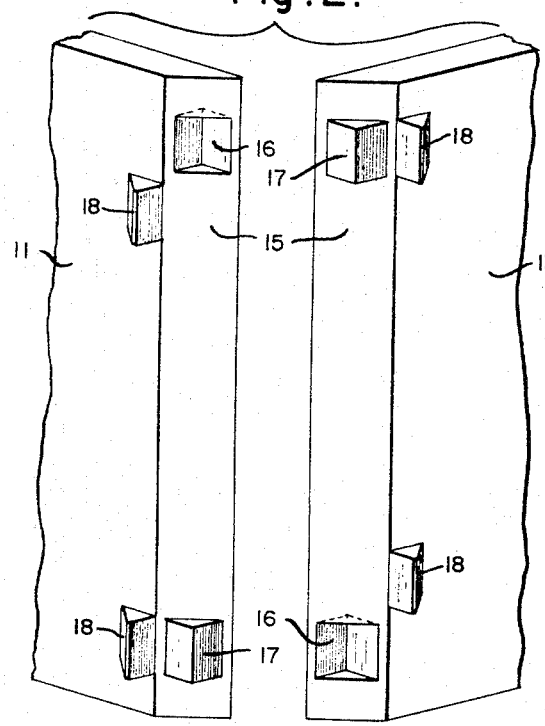
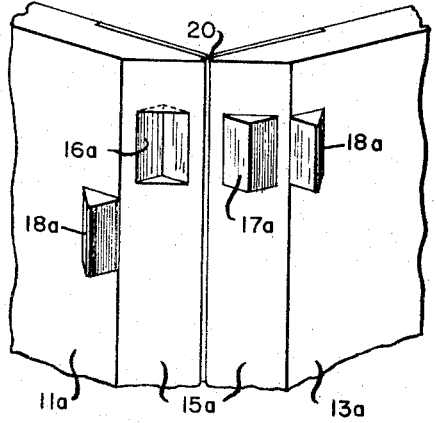
INVENTORS
Robert P. Habgood, Jr.
Joseph N. Ianuzzi 3,415,406
CORNER JOINT STRUCTURE FOR
RECTILINEAR CONTAINERS
Robert P. Habgood, Jr., and Joseph N. Ianuzzi, Bradford,
Pa., assignors to Plexowood, Inc.
Filed May 19, 1967, Ser. No. 639,825
6 Claims. (Cl. 217—65)

ABSTRACT OF THE DISCLOSURE

A furniture case and jointure system for rectilinear objects having side and end panels of molded wood chips and resin, each panel having a joining edge with a 45° bevel face, spaced recesses in each said face and spaced shoulders on each face between said recesses, the shoulders on the faces of each side panel fitting within the recesses of the faces of adjacent end panels and connecting means, such as glue, between the faces.

---

This invention relates to furniture cases and jointure systems for rectilinear objects and particularly to a furniture case structure and method of making the same incorporating molded wood products of wood chips and resin.

Standard cabinet making procedures for wood joinery are well known and have evolved from the nature of the grain-oriented strength of wood and from the appearance of wood in end grain and side grain views. Board of various types have been joined into boxes and cases with mitred edges and this has been done generally with the inclusion of a key or tongue which is a separate piece of wood inserted in a groove which has been cut perpendicularly into the joined beveled faces. The tenon is usually glued in. Alternatively, special metal hardware may be used to serve as a keying means. These latter are exemplified by the familiar flat corrugated fastener which is driven usually in the end grain of soft woods to hold them together, or the many systems of fastening mitred picture frames. Since furniture cases exemplify the entire area of rectilinear objects, we shall hereafter refer only to furnitures cases as representative of the group.

All of these systems serve specific purposes and present limitations which make them somewhat deficient for the purposes we wish to serve; namely, to join the edges of furniture "cases" such as night stands, bureaus, dressers, etc. Such furniture pieces require that certain forces to which they are commonly subjected be successfully withstood. Generally, if each surface can be loaded perpendicular to its surface without overtaxing the joints then such joints will be sufficient.

We have invented a furniture case and system of making the same of molded wood products formed of wood chips and resin which provides the necessary strength at the joint to support vertical loading and withstand the separation of the joint while at the same time providing all the advantages of the mitred joint.

In the structure which we have invented the joint is mitred and provides a joint which does not expose an end grain at any point. Such a joint is readily assembled by unskilled workers at the point of distribution and thus the parts of the case can be shipped in the flat or "knocked-down" form, saving transportation and storage costs. Moreover, by avoiding end exposure we avoid the problems inherent in finishing the corner edges of the finished furniture case.

In order to provide a strong joint capable of withstanding loading on the joint, particularly in the plane of the joint, we provide interlocking members formed in the side pieces being joined.

In a preferred embodiment, we provide a furniture case comprising side and end panels of molded wood chips and resin, each panel having a joining edge having a 45° bevel face, spaced recesses in each said bevel face, spaced shoulders on each said bevel face between said recesses, the shoulders on the faces of each side panel fitting within the recesses on the faces of each adjacent end panel to form a joint and connecting means between adjacent faces. Preferably, the recesses and shoulders are provided with a slight taper to provide a tight clamping action at the joint and an adhesive is applied to the joint surfaces. Preferably, the side and end members are molded in tandem in a single plane with the edge of one bevel face abutting the edge of the next adjacent bevel face and provided with a flexible bridging member which may be paper, plastic, metal or the like material.

In the foregoing general description of our invention we have set out certain objects, purposes and advantages of our invention. Other objects, purposes and advantages of our invention will be apparent from the following description and the accompanying drawings in which:

FIGURE 1 is an isometric view partly cut away of a furniture case made according to our invention;

FIGURE 2 is an enlarged unfolded view of the corner joint of FIGURE 1;

FIGURE 3 is a section on the line III—III of FIGURE 1;

FIGURE 4 is a section on the line IV—IV of FIGURE 1; and

FIGURE 5 is an enlarged unfolded fragmentary view of a joint according to a second embodiment of our invention.

Referring to the drawings, we have illustrated furniture case sides 11 and 12 and ends 13 and 14 made of molded wood chips and resin. Each end of each side 11 and 12 and each end 13 and 14 is provided with a bevel face 15 having spaced apart recesses 16 and shoulders 17, the shoulders 17 adapted to fit within the recesses 16 of the next adjacent face. The recesses 16 are slightly tapered at each end to tightly engage and slightly compress the ends of shoulders 17 to provide a tight engagement. Preferably supporting members 18 of triangular cross section are fixed on each side 11 and 12 to lie one above the other and be glued to the other side when assembled to support the same in proper angular position. The adjacent faces are forced together with a glue bond between and held until the glue sets to form the joint. As illustrated, the recesses and shoulders at one end of each side and end are preferably the reverse of those at the other end so that the several sides and ends may be assembled without regard to position. This makes it possible to use four identical sides or ends to form a cubical case or two sides and two ends to form a rectangular case.

In the embodiment illustrated in FIGURE 5, the sides and ends are identical to those of FIGURES 1 and 2 and bear like numbers with the suffix a. During the molding operation the ends 13 and 14 and sides 11 and 12 are molded in tandem in the same plane in a single mold with a bendable or flexible bridging member 20 of metal or paper molded into each adjacent end. The bevel faces, recesses and shoulders are coated with glue and sides folded at the bridging member 20 to form the joint.

It will be apparent from the foregoing description that furniture cases made according to our invention may be assembled by unskilled workers with the minimum of tools to produce a perfect joint at each corner. In each case the joint will have great rigidity and will resist shearing at the joint. Furthermore, no end grain is exposed at any point and no difficult joint finishing operation is required.

While we have illustrated and described certain preferred practices and embodiments of our invention, it will be understood that this invention may be otherwise embodied within the scope of the following claims.

We claim:

1. A rectilinear case comprising side and end panels of molded wood chips and resin, each panel having a joining edge with a 45° bevel face, at least one recess in each said bevel face, at least one shoulder on each said bevel face, the shoulders on the faces of each side panel fitting within the recesses on the faces of each adjacent end panel, a generally triangular supporting member on each panel adjacent the bevel face adapted to bear against an adjacent panel to support it in proper angular position, and connecting means between adjacent faces.

2. A furniture case as claimed in claim 1 wherein the connecting means is glue.

3. A furniture case as claimed in claim 1 wherein each recess is tapered at its ends to engage a cooperating shoulder in a tight taper fit.

4. A furniture case as claimed in claim 1 wherein the end panels and side panels are connected by a bendable member fixed thereto and forming a part thereof.

5. A furniture case as claimed in claim 4 wherein the bendable member is paper.

6. A furniture case as claimed in claim 4 wherein the bendable member is a metal strip.

References Cited

UNITED STATES PATENTS

| | | |
|---|---|---|
| 463,777 | 11/1891 | Reed. |
| 782,639 | 2/1905 | Bailey. |
| 948,503 | 2/1910 | Ferguson _____ 217—17 |
| 1,385,958 | 7/1921 | Van Fleet. |
| 2,240,256 | 4/1941 | Elmendorf _____ 217—65 XR |
| 2,362,904 | 11/1944 | Kramer _____ 217—65 XR |
| 2,551,775 | 5/1951 | Von Canon _____ 217—65 |

RAPHAEL H. SCHWARTZ, *Primary Examiner.*

U.S. Cl. X.R.

287—20.92; 189—36